Feb. 3, 1942. R. B. COTTRELL 2,271,628
BRAKE GEAR SAFETY DEVICE
Filed Nov. 24, 1939 3 Sheets-Sheet 1
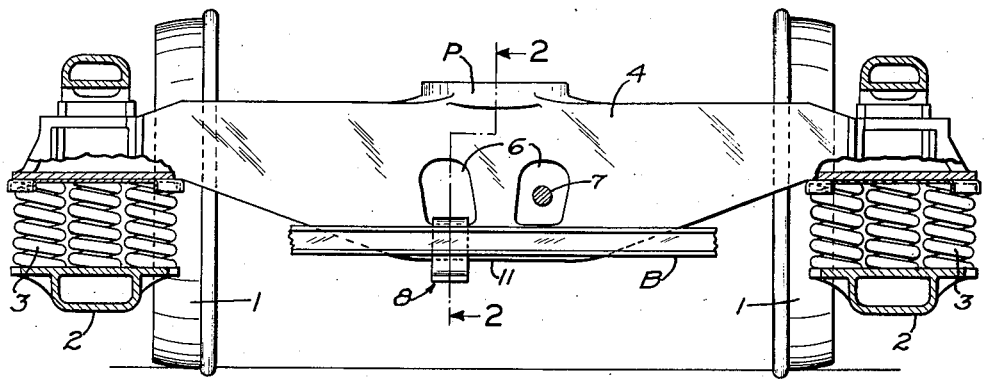
FIG.1.
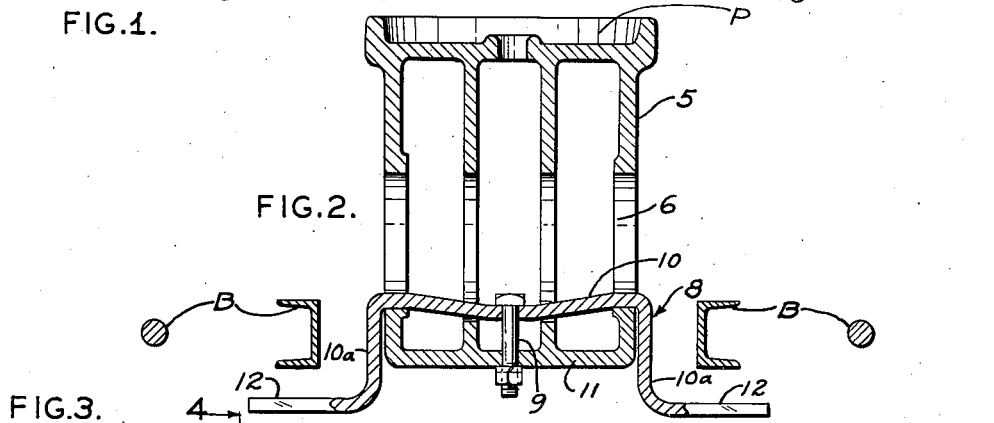
FIG.2.
FIG.3.
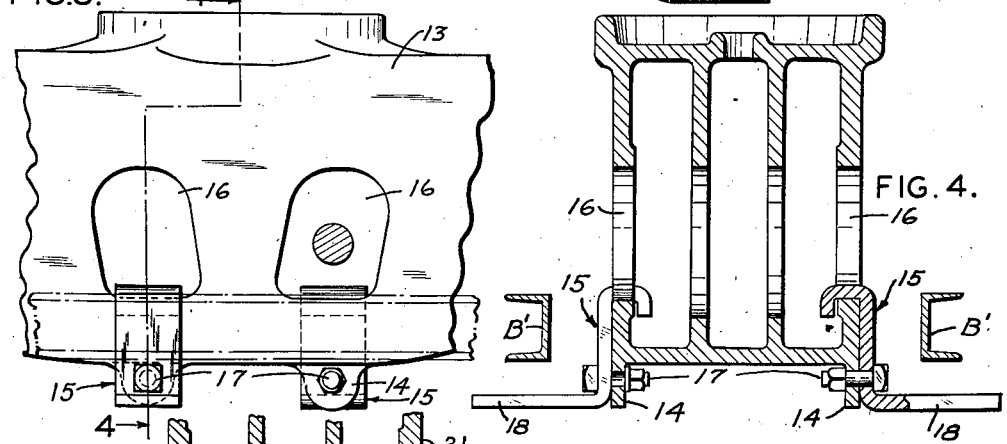
FIG.4.
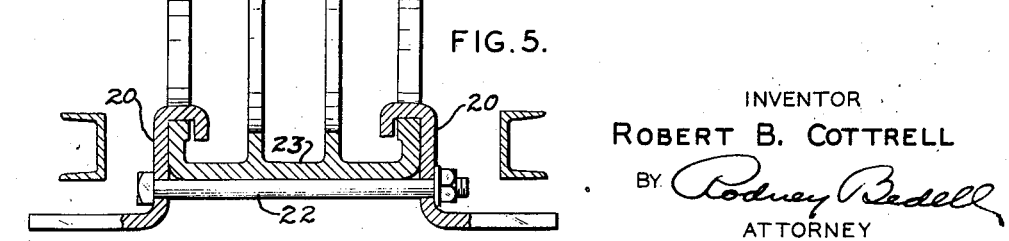
FIG.5.
INVENTOR
ROBERT B. COTTRELL
BY Rodney Bedell
ATTORNEY Feb. 3, 1942.  R. B. COTTRELL  2,271,628
BRAKE GEAR SAFETY DEVICE
Filed Nov. 24, 1939  3 Sheets-Sheet 2
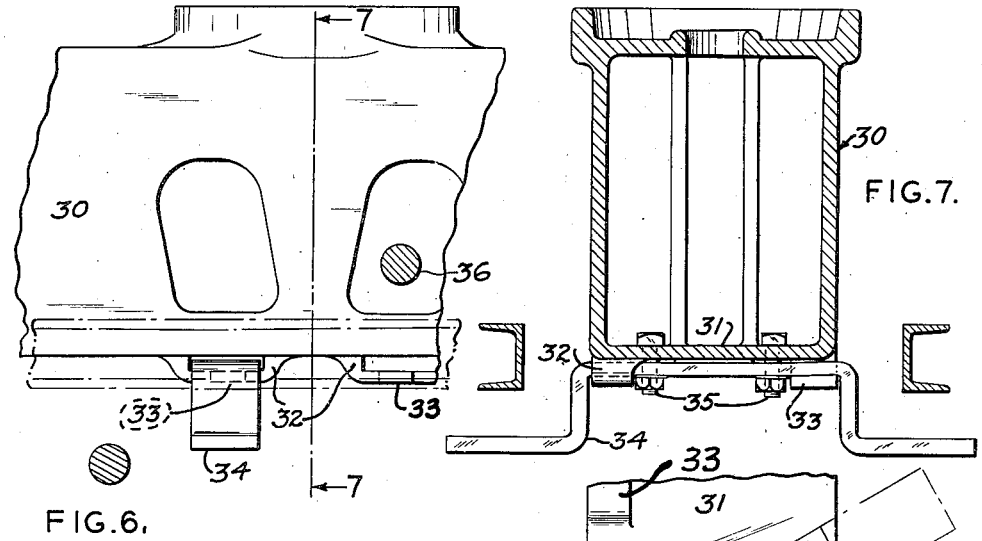
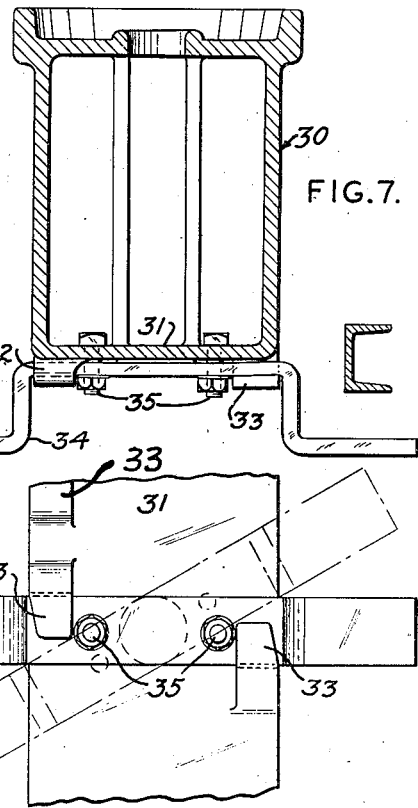
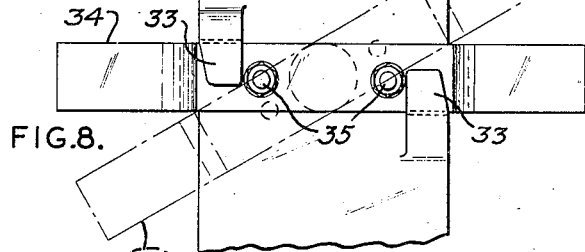
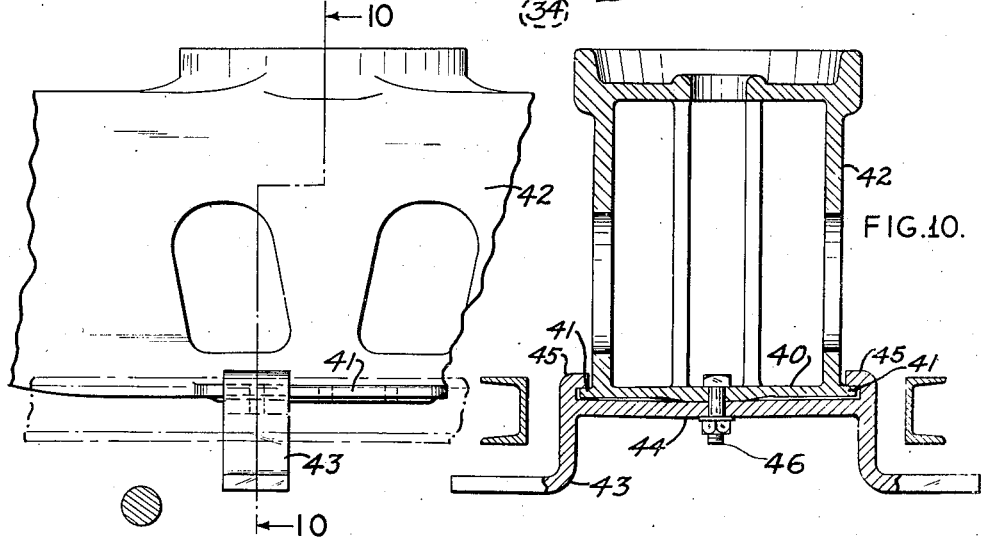
INVENTOR
ROBERT B. COTTRELL
BY Rodney Bedell
ATTORNEY INVENTOR
ROBERT B. COTTRELL
BY
Rodney Bedell
ATTORNEY Patented Feb. 3, 1942

2,271,628

UNITED STATES PATENT OFFICE 2,271,628

BRAKE GEAR SAFETY DEVICE

Robert B. Cottrell, Chicago, Ill., assignor to American Steel Foundries, Chicago, Ill., a corporation of New Jersey Application November 24, 1939, Serial No. 305,770

11 Claims. (Cl. 188—210)

The invention relates to railway rolling stock and more particularly to safety devices for underlying the brake gear and preventing the same from falling to the track in the event of the failure of usual supports.

It is common practice, on trucks having spring planks, to mount the safety guards on the spring planks, but frequently difficulty is encountered in mounting safety guards on spring-plankless trucks.

The main object of the invention is to utilize the lower portion of the truck bolster for mounting suitable safety guards.

Another object is to carry the safety guard directly on bolster elements without relying upon bolts or rivets for supporting the guard, although bolts and rivets may be used for positioning the guard on the bolster.

Another object is to mount a safety guard on the bolster in such manner that it is readily removable from the bolster for repair or replacement or for other reasons.

It is another object to arrange the guard mounting elements of the bolster so the bolster may be reversed end for end without affecting the utility of the guard mounting elements.

These and other specific objects are attained in the structures illustrated in the accompanying drawings in which—

Figure 1 is a vertical transverse section through a railway truck and illustrates one form of the invention.

Figure 2 is a vertical section taken on line 2—2 in Figure 1.

Figure 3 is a side elevation of a substantial part of a truck bolster and illustrates another form of the invention.

Figure 4 is a vertical section taken on line 4—4 in Figure 3.

Figure 5 is a vertical section, similar to Figure 4, showing another form of the invention.

Figure 6 is a view similar to Figure 3 but illustrates another form of the invention.

Figure 7 is a vertical section taken on line 7—7 in Figure 6.

Figure 8 is a bottom view of the truck bolster shown in Figures 6 and 7.

Figure 9 corresponds to Figure 6 but illustrates another form of the invention.

Figure 10 is a vertical section taken on line 10—10 in Figure 9.

Figures 11, 12:
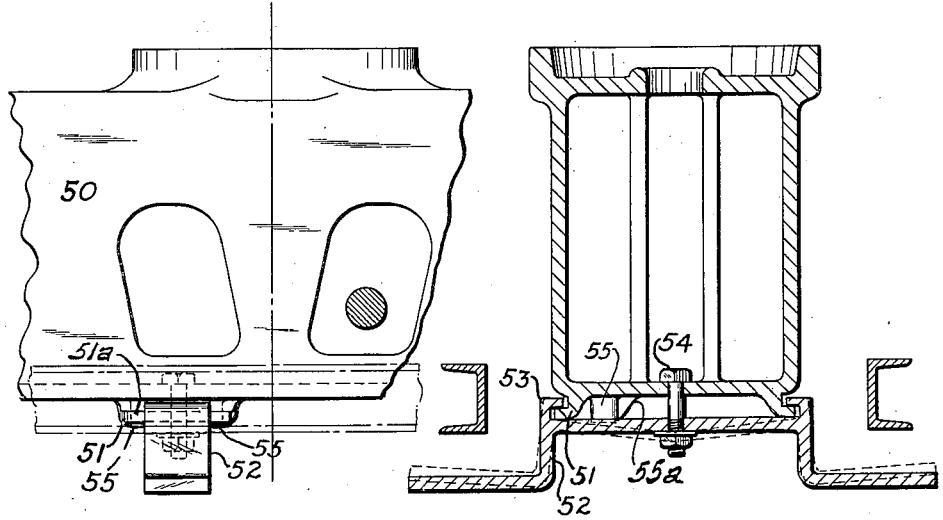
Figure 13:
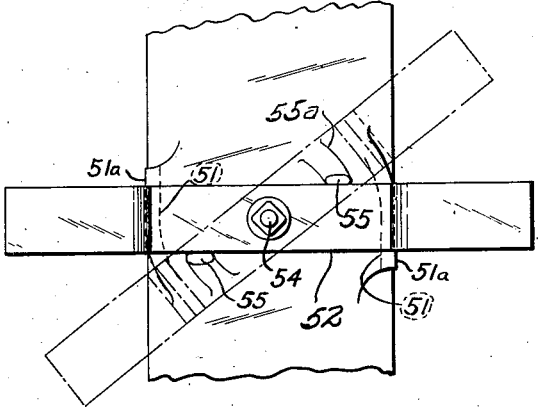

Figures 11, 12 and 13 correspond to Figures 6, 7 and 8 but illustrate another form of the invention.

Reference is made to a divisional application, filed September 27, 1941, Serial No. 412,576, with claims specific to the forms of the invention shown in Figures 2-5 of the present application.

Figures 1 and 2 illustrate the parts of a truck essential to an understanding of the present invention and include wheels 1 which will carry the usual axles and journal boxes (not shown) from which the truck side frames 2 are supported. Bolster springs 3 are seated on the side frames and yieldingly support the cast steel box-section bolster 4 extending from side to side of the truck and including the body supporting center plate P.

The bolster side walls 5 are apertured at 6 to accommodate the removal of the cores used during the casting of the bolster, and these openings are symmetrical about the transverse center line of the bolster and either one is adapted to receive the brake connection rod 7 according to which side of the bolster center line the connection rod is on.

Each of the openings is also adapted to receive a safety guard 8 passing through the bolster and carried on the lower edges of the openings. The guard is anchored in place by bolt 9 extending through the central portion 10 of the guard and the corresponding portion of the bolster bottom wall 11.

At the ends of guard portion 10 the guard extends downwardly as at 10a to embrace the bolster side walls and then outwardly as at 12 to underlie one or both of the main members of the brake beams B; the guard is spaced below the brake beams sufficiently to accommodate vertical movement of the bolster on its springs relative to the brake beams which are hung from the truck frame by the usual supporting hangers (not shown).

Bolt 9 holds the guard arm to its seat and prevents all play between it and the bolster, but the weight of the arm and its load, if any, is taken by the bolster direct and does not depend upon the bolt or other securing elements.

By mounting a safety guard on the bolster in this manner the bolster may be reversed end for end and the position of brake rod 7 and safety guard 8 may be interchanged relative to the bolster according to the direction of inclination of the brake lever (not shown).

Figures 3 and 4 illustrate another arrangement in which bolster 13 is similar to bolster 2 but its side walls have depending lugs 14 to which separate safety guards 15 are bolted. The inner portion of each guard 15 is turned upwardly, inwardly and downwardly to hook over the upwardly-facing ledge formed in the bolster side wall by an aperture 16. An individual bolt 17 passes through the vertical portion 15 of the safety guard and an adjacent lug 14. Bolts 17 are easily accessible and their removal is all that is necessary to effect removal of the guard from the bolster. An outer portion 18 of the guard extends horizontally under the brake beam indicated at B¹.

Figure 5 illustrates separate supports 20 mounted on the bolster 21 similarly to the arrangement shown in Figures 3 and 4 but bolster 21 has no depending lugs for individual guard retaining bolts. In place thereof a single bolt 22 is passed through both supports 20 and beneath the bolster bottom wall 23.

In each form of the invention illustrated in Figures 3, 4 and 5, either one of the supports may be removed without detaching the other one, and with the arrangement shown in Figures 3 and 4 the supports may be staggered lengthwise of the bolster as indicated in Figure 3, or both may be arranged on the same transverse line as are the supports shown in Figure 5.

Figures 6, 7 and 8 show a bolster 30 including a bottom wall 31 from which two pairs of L-shaped lugs depend. The vertical legs 32 of one pair of lugs are on opposite sides of a line extending transversely of the bolster and corresponding to the longitudinal center line of the support member 34 when the latter is in functioning position as indicated by full lines in Figure 8. The horizontal legs 33 of the lugs extend in opposite directions and towards said line and overlap each other transversely of the bolster.

The support arm may be assembled with the bolster by placing it in the position indicated in broken lines in Figure 8 and then twisting it angularly about a central vertical axis to position its central body part over horizontal legs 33 of the lugs. Preferably, bolts 35 are inserted through the arm and the bolster bottom wall to maintain the support arm in desired position. A corresponding pair of lugs are shown at the opposite side of the bolster transverse center line and the support member may be mounted on either pair of lugs either beneath or at the opposite side of the bolster center line from the brake connection rod 36.

Figures 9 and 10 illustrate a form of the invention in which the bolster bottom wall 40 has a portion 41 of restricted length wide enough to project laterally from the bolster side walls 42 to provide ledges adapted to mount the brake gear support member 43. The latter has a central body part 44 and upwardly and inwardly turned elements 45 forming hooks for receiving ledges 41.

The support member may be slid along the bolster bottom wall from a point beyond the ends of ledges 41 to a point abreast of the same at which the hooks are engaged, and a detachable bolt 46 may be passed through the bolster bottom wall and the support arm to maintain the latter in desired position.

While the ledge 41 is shown as extending continuously on both sides of the transverse center line of the bolster far enough to position the support arm so that it will be spaced from the brake beam strut, if desired the ledges may be made shorter and spaced from each other corresponding to the spacing of the depending lugs 14 shown in Figures 3 and 4.

Figures 11, 12 and 13 illustrate a form of the invention combining features disclosed in Figures 6–8, 9 and 10. The bolster 50 has depending L-shaped lugs 51 with their horizontal legs extending transversely of the bolster and provided with depending shoulders 51a. The support bar 52 includes hook-like elements 53 arranged to receive the horizontal legs of lugs 51 whereby the support is carried by the bolster. A bolt 54 is passed through the bolster bottom wall and the middle of the support and may be tightened to draw the support upwardly from the dotted line position shown in Figure 12 to the solid line position. Preferably, the bolster bottom wall is provided with stops 55 projecting downwardly at the sides of bar 52 at points diagonally opposite to shoulders 51a, and cooperating with shoulders 51a to hold the support against movement from its functioning position when bolt 54 is tightened. The support will be applied to the bolster with a horizontally rotating movement from the position shown in broken lines in Figure 13 to the position shown in full lines, similar to the assembly movement required in the structure shown in Figures 6–8. Lugs 51 are curved as shown in Figure 13 to accommodate such movement and the stops 55 have inclined rear surfaces 55a to facilitate movement of the bar over the bottoms of the stops. By loosening bolt 54 the support device may be turned from its functioning position and one or both brake beams may be dropped from the truck without removal of the support.

If shoulders 51a and stops 55 are omitted, or placed on one side only of the bar, the support may be assembled with the bolster lugs 51 by a sliding movement longitudinally of the bolster similar to the assembly movement of the structure shown in Figures 9 and 10. With such an arrangement, a headed pin similar to bolt 54 may be dropped through the bottom wall of the bolster and a suitable aperture in bar 52.

In each form of the invention the support structure includes a hook-like part for receiving bolster elements whereby the support structure is carried directly by the bolster and is held against shifting movement transversely of the bolster.

In each form of the invention the support arm may be distorted slightly by the detachable bolt to prevent rattling or play between the support arm and the bolster although the bolt is not relied upon to carry the weight of the arm or any load which may be imposed thereon.

While the drawings illustrate the support arm mounted at opposite sides of the transverse center line of the bolster to space the same from the strut of a truss-type brake beam, it will be understood that the support may be positioned beneath the transverse center line of the bolster if desired. The term "support" is used to describe the member having parts underlying the brake beam irrespective of whether or not the member is used at all times to support the beam or acts normally as a guide for the beam or functions as a safety guard with which the beam will contact only in emergency as, for example, upon failure of the beam hanger or its pin.

The structures illustrated in the drawings may be modified otherwise without departing from the spirit of the invention and the exclusive use of such modifications as come within the scope of the claims is contemplated.

What is claimed is:

1. In combination with a railway truck bolster having a horizontal web and having integral upwardly-facing elements spaced apart transversely of the bolster, a separately formed detachable brake gear support structure comprising a bar extending transversely of the bolster over said bolster elements and directly carried thereby and engaging upright parts of the bolster to hold the structure against shifting transversely of the bolster, there being detachable means extending vertically through said web and bar and holding said structure in assembled relation with said elements but being free of the weight of the structure.

2. In combination with a railway truck bolster having integral depending lugs provided with upwardly-facing horizontal elements, a brake beam support structure extending over and carried by said elements, and means spaced from said elements to hold said structure against play on said lugs.

3. A railway truck bolster and support structure combination as described in claim 2 in which the support structure includes a hook-forming portion arranged to receive the bolster lugs to hold the structure against movement transversely of the bolster.

4. In combination with a railway truck bolster having a bottom wall and L-shaped lugs depending therefrom, one leg of each lug being vertical and the other leg being horizontal and spaced from the bottom of the bolster, said lugs facing in opposite directions longitudinally of the bolster with their horizontal legs being spaced apart and overlapping each other transversely of the bolster, a brake gear support member carried on said horizontal legs and being removable from the bolster by being turned about a vertical axis intermediate said lugs to move away from said lugs so said member may be dropped from the bolster.

5. A bolster and support combination as described in claim 2 which also includes means spaced from the lugs for holding the support member against play relative to the bolster.

6. In combination with a bolster including a bottom wall having a portion of restricted length but of greater width than the adjacent part of the wall, brake gear support member having a central horizontal body part with upstanding inturned hooks at the ends thereof, said body part and hooks being arranged to move over said bottom wall from a position clear of said portion of greater width to a position in which said hooks engage the edges of said portion to mount the support member on the bolster.

7. A combination of a bolster and support structure as described in claim 6 which also includes a detachable retaining means passing through the bolster bottom wall and the support member to hold the latter against movement over the bolster bottom wall.

8. In combination with a railway truck bolster having depending L-shaped lugs, one leg of each lug being vertical and the other leg being horizontal and spaced from the bottom of the bolster, said lugs having their horizontal legs spaced apart transversely of the bolster, a brake gear support member carried on said horizontal legs and being removable therefrom by being shifted away from said lugs so the member may be dropped from the bolster.

9. In combination with a railway truck bolster having a bottom wall and lugs depending therefrom with upwardly facing elements, a brake gear support arm, and means pivotally supporting said arm from said wall, said arm being movable on said means to a position in which it is carried on said elements and extends longitudinally of the truck beneath the brake gear and to a position in which it extends more nearly transversely of the truck to clear the brake gear and permit dropping of the latter without removal of said arm from the bolster.

10. A structure as described in claim 9 which also includes a device for holding the support arm against movement on its pivot from a functioning position to a non-functioning position.

11. In combination, a railway truck bolster having a bottom wall and lugs depending therefrom and facing upwardly and outwardly transversely of the bolster, said lugs extending a relatively short distance lengthwise of the bolster, a brake gear support arm extending transversely of and beneath the bolster and having upwardly projecting hook elements receiving said lugs to carry the arm, and a mounting and pivot member extending through asid wall and arm intermediate said lugs and about which said arm may be turned to disengage said hook elements from said lugs and to permit dropping of the brake gear without removal of said arm from the bolster.

ROBERT B. COTTRELL.